Patented Oct. 27, 1936

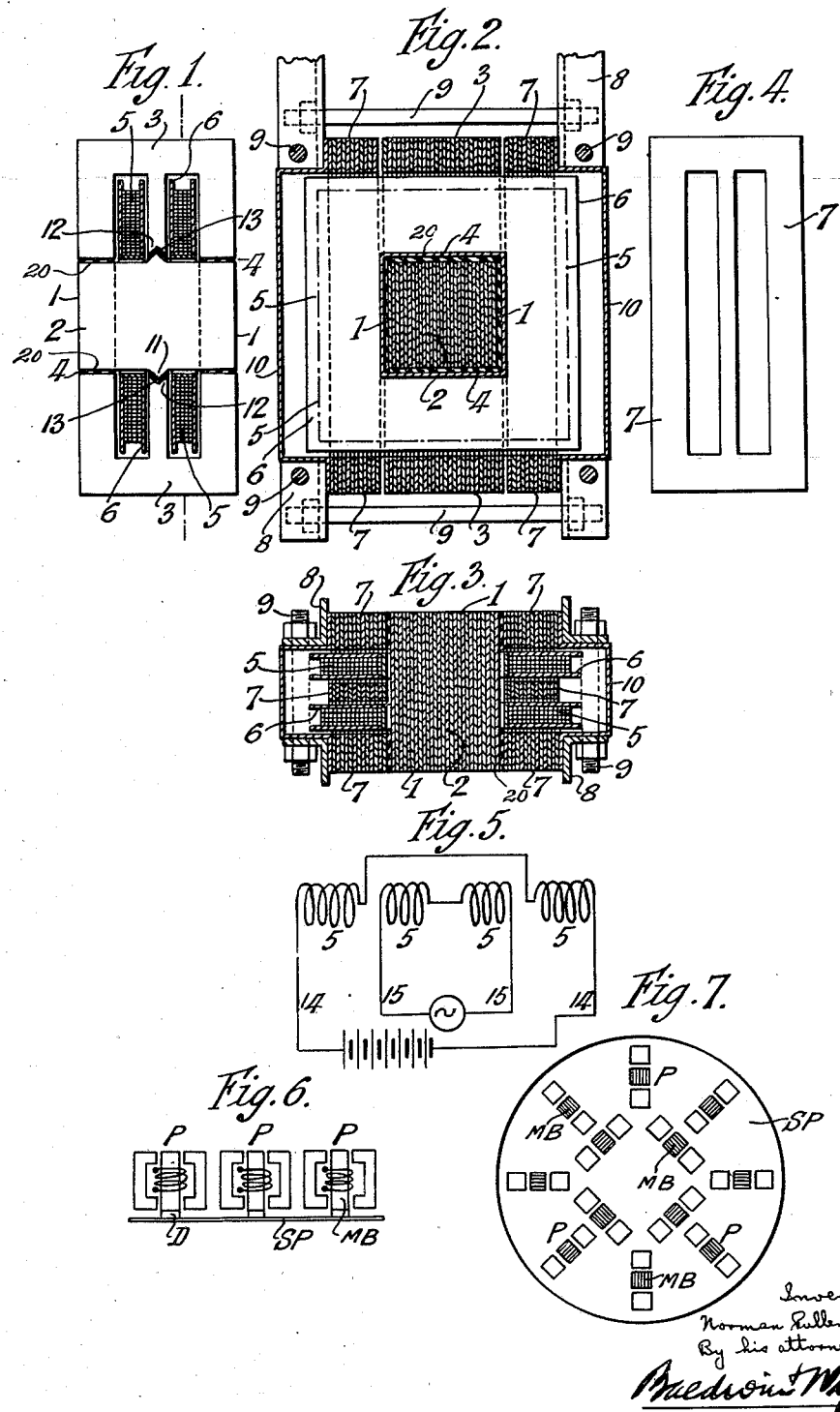

2,059,107

UNITED STATES PATENT OFFICE 2,059,107

PRESSURE WAVE TRANSMITTER AND RECEIVER INCORPORATING MAGNETOSTRICTIVE DEVICES

Norman Pullen Hinton, Finchley, London, England, assignor to The Marconi International Marine Communication Company Limited, London, England Application May 2, 1933, Serial No. 669,021
In Great Britain May 25, 1932

7 Claims. (Cl. 177—386)

This invention relates to pressure wave transmitters and receivers incorporating magnetostrictive devices for the conversion of electrical energy into mechanical vibrations and vice versa and more specifically to transmitters and receivers suitable for use in echo sounding, subaqueous signalling systems, and systems wherein the presence of underwater bodies e. g. icebergs are detected by transmitting pressure waves and observing the consequent reflected waves if any.

It is well known to perform subaqueous signalling or echo sounding or detection of underwater bodies by means of devices adapted to transform electrical impulses or waves into mechanical vibrations which are transmitted to the sea or other medium in the form of pressure waves, said pressure waves, in the case of echo sounding systems, being transmitted to the boundary of the medium and reflected back therefrom, the time taken for the journey of the pressure wave to the boundary of the medium and back, in conjunction with the knowledge of the speed of propagation of the said pressure waves in the medium in question, giving a measure of the distance between the point of propagation and the point of reflection.

The present invention provides improved transmitters and receivers of the general kind above set forth and as above stated utilizes the well known phenomenon of magnetostriction to transform electrical impulse or waves into mechanical vibrations and vice versa.

A magnetostrictive transmitter may operate by reason of a change of length producing a pressure wave and/or by reason of a change of breadth producing such a wave. The changes in length and breadth are opposite in the sense that an increase in the one dimension is accompanied by a decrease in the other, the volume remaining sensibly constant.

According to the present invention a pressure wave transmitter and/or receiver comprises a magneto-strictive body, an energizing winding associated with said body and a magnetic path of low reluctance adapted to complete the magnetic circuit through said body and such that the total reluctance of the complete magnetic circuit is not substantially greater than that of the magnetostrictive body itself.

The changes in dimensions may be caused to occur in a magnetostrictive body of any of a variety of different shapes e. g. it may be a simple rod or a hollow cylinder or a member having two, three or more limbs such as a U-shaped core or an E-shaped core. Where required polarizing may be effected in various ways, for example, by means of separate windings, superimposition of D. C. in an A. C. winding (e. g. by choke feed) or by means of permanent magnets. The polarizing field may be coincident with the A. C. field or it may be caused to oppose the A. C. field in one limb (at any given instant) and assist in the other (at the same instant). An example of the last described arrangement is where a U-shaped magnetostrictive body is employed, the A. C. winding being wound on one limb of the U or on the base thereof, and the polarizing winding being wound round both limbs. In this arrangement one limb will give a "pull" effect, while the other "pushes" and vice versa.

The application to under sea water submarine work necessitates a suitable choice of non-corrosive material, a definite formation of the projector active surface, a watertight protection of the energizing windings and a suitable housing for the projector itself. Another important point is the necessity for the projector to be able to act immediately as a receiver without alteration since this presents the advantage in the particular case of echo-depth sounding in small depths that the source of the pressure waves and the receiver thereof are at the same position, thereby avoiding errors which would arise due to the water path of the pressure waves if a separate receiver located away from the transmitter were employed.

In carrying out the present invention the method proposed for utilizing the magnetostrictive qualities of the materials used, is by means of longitudinal vibrations of a straight bar specimen, with a cross-section of round, square or rectangular section, and it is highly desirable, if not absolutely essential that it should be supported at its centre, where, of course, under these conditions of resonant vibration, the movement is zero, both ends being free to move longitudinally. Energization is preferably effected at a frequency equal to the natural frequency of longitudinal vibration of the body as determined by the speed of propagation of sound through the particular magnetostrictive material utilized. The magnetostrictive body thus vibrates as a half-wave oscillator.

To cause the fundamental frequency of vibration to be equal to that of the energizing coil the specimen may be polarized either by a permanent magnet suitably arranged relative to the specimen bar but preferably either the energizing coil itself is suitably fed with direct current through an H. F. choke, or a complete separate winding is arranged around the specimen or around the yoke portion of the magnetic circuit.

It is believed that the nature of the invention and the various considerations affecting the design of an efficient magnetostrictive projector will be better understood from the following brief description of various experimental results which have been obtained with different magnetostrictive specimens.

Experimental tests conducted on solid rods of magnetostrictive material suspended at the middle and excited by means of an energizing coil placed about the specimen under test have shown that the solid rod produced a short-circuited turn effect on the energizing coil and prevented any appreciable flux densities being obtained at high energizing frequencies. Further tests were carried out with an energizing coil of low inductance but, due to the small alternating flux change obtained, the specimen only moved feebly, the inductance change at resonance being small. The change of resistance was also small and the resistance introduced off resonance was small.

Similar tests with laminated magnetostrictive bodies showed higher initial resistance, greater inductance changes at resonance and larger resistance changes at resonance provided the laminations were thin; for example, with laminations 4 mils. thick inductance changes of over 50% were obtained. With laminations 20 mils. thick substantially smaller inductance and resistance changes were observed.

Further tests on specimens built up from thin insulated laminations showed increased resistance changes as the area (i. e. the moving face area) of the specimen was increased, thus indicating that on the assumption that the same movement was taking place in the larger area specimens as in the smaller specimens more power was required, and therefore for the same current input the larger area specimens must of necessity show more equivalent resistance.

In order to increase the A. C. flux density changes in the specimen it was found necessary to improve the magnetic circuit and consequently the magnetic circuit of the rod shaped specimen was improved by partially closing the magnetic circuit by high permeability magnetic material and calculation showed that with the use of high permeability material such as "Stalloy" or nickel-iron the total reluctance of the circuit was not substantially greater than the reluctance of the magnetostrictive specimen itself, particularly in the case of nickel which is, of course, not highly magnetic. Experiments with various magnetostrictive materials showed that, for the same flux density change, nickel, as compared with nichrome (15% chromium, 20% iron, 65% nickel) and nickel-iron (36% nickel and 64% iron) was greatly superior in magnetostrictive properties. This fact is, however, counterbalanced to some extent by the higher permeabilities of nichrome and nickel-iron.

It was found, moreover, that the degree of polarization i. e. the D. C. flux component, plays a very important part in obtaining magnetostrictive movements particularly in the case of nickel. As the polarization is increased the incremental permeability of nickel falls and the inductance of a coil placed round the specimen falls due to the smaller A. C. flux changes. The initial resistance of the circuit also falls so that for a given applied voltage the losses in the magnetostrictive material and in the iron magnetic circuit remain substantially constant irrespective of the inductance of the winding employed.

It would appear that nickel shows a threshold effect as regards polarization which must be reached before movements of useful magnitude take place. This threshold value or polarization appears to have no relation to the A. C. flux swing, but it is essential that the A. C. flux swing never be greater than the D. C. flux, otherwise the magnetostrictive rod tends to oscillate at frequencies other than the fundamental frequency. It has been found in practice that for good electrical efficiency the D. C. ampere turns should exceed the A. C. ampere turns in the ratio of at least 10:1.

As stated above as the polarizing flux is increased inductance and resistance fall substantially proportionally and thus the losses in the magnetic circuit (nickel and iron) remain substantially constant for a given voltage. For a given voltage however the power supplied will increase as the inductance and resistance values fall so that better electrical efficiency is obtained with a high degree of polarization.

The majority of the above considerations refer to small magnetostrictive specimens such as rods of ½" diameter and specimens of 1" x 1" surface faces.

In depth sounding apparatus generally, radiation may take place spherically or power may be radiated in a directive water wave. With spherical radiation the power required in order to obtain sufficient reflected wave energy would be very substantial indeed and calculation shows that in order to produce a directive beam with a divergency of about 13° a moving face area of approximately 22 sq. cms. would be required.

Apart from the cost of making a laminated magnetostrictive body of this size difficulties immediately present themselves in obtaining a uniform flux and a reasonable value of inductance for tuning purposes unless only a few turns of energizing winding are used. Apart from the question of directivity, however, it is not essential that a specimen of such size be employed as the following considerations will show.

With a rod shaped specimen of area A and length $l$ and with a partially closed magnetic circuit wherein the reluctance of air gaps and a "Stalloy" or nickel-iron return circuit are small as compared with the reluctance of the specimen itself, the total inductance will be approximately $$\frac{.4\pi T^2 \mu A \times 10^{-8}}{l}$$

henries and the A. C. flux density=

$$\frac{.4\pi G T \mu}{l}$$

where T=the number of turns $\mu$ is the permeability of the magnetostrictive material employed and G is the A. C. energizing current. In order to tune the specimen, a reasonable value of inductance must be chosen so that with a suitable tuning capacity the frequency will be equal to the natural frequency of the magnetostrictive specimen.

If it be now assumed that the area A is increased four times it will be seen from the above formulæ that the number of turns for the same inductance will be reduced by half and the A. C. flux density for the same current will be reduced by half assuming a constant value for $\mu$. Actually however, the permeability will fall somewhat as the flux density falls with the result that for four times the area and the same inductance the number of turns is slightly more than half.

Now since the movement under magnetostriction is proportional to the flux density change it will be seen that the movement is reduced by half but (movement)$^2 \times$ area is proportional to the power radiated and in the case where the area is A power radiation = (unit movement)$^2 \times A$ which may be written $I^2R$ where R is the equivalent resistance in ohms and I is the current in amperes. The power radiated in the second case, where the area is 4A, may be written $$\tfrac{1}{2}(\text{movement}) \times ^2 4A = I^2 R_1$$

from which it follows that for equal values of L, $R = R_1$. Thus the power radiated remains sensibly constant irrespective of the area of the specimen, always assuming the value L to be unchanged.

This calculated fact is of the greatest importance from the design point of view and for a given inductance value the face area of the magnetostrictive element can be of any reasonable size provided that the movement of the face of a small projector is not so great as to cause cavitation in the water for a given power and also provided that under these conditions the A. C. flux density has not reached such a value that no further expansion or contraction takes place under magnetostrictive action.

This conclusion has led to the design of a small and economical projector the face area of the specimen employed being of the order of the water wave length with the result that means, other than the adoption of a large face area, must be employed if it is desired to obtain directivity. The attainment of directivity may be achieved either by the use of a suitable reflector e. g. a parabolic reflector, or alternatively the magnetostrictive projector may comprise a plurality of small projectors arranged to produce directivity by the interference method. This latter scheme is particularly applicable to very large powers and from the foregoing considerations would appear to be the only practical method of dealing with large powers without excessively increasing the voltage and current required.

The following considerations regarding the equivalent series resistance exhibited by the energizing circuit of a magneto-strictive projector are also of importance from the design point of view since the equivalent resistance gives a direct measurement of the power radiating possibilities of any particular projector. It is found that the larger the specimen employed the higher the equivalent series resistance thereof for the same amount of movement, or, stated in another way, the watts supplied to a vibrating specimen divided by area is for a fixed length of specimen, a measure of the movement squared.

Thus $\dfrac{\text{watts}}{\text{area}}$ varies as (movement)$^2$ i. e. watts varies as (movement)$^2 \times$ area.

Now watts $= I^2R$ varies as (movement)$^2 \times$ area.

Thus it will be seen that in order to ascertain the efficiency of a projector it is necessary to know the current supplied as well as the resistance.

Now current depends upon the total impedance of the circuit and consequently a projector having large resistance may be a poor radiator if the inductive or capacitative reactance is large as compared with the resistance. It follows, therefore, that the inductive or capacitative reactance of a projector should be kept as small as possible compared with the resistance. In this way the current at resonance will be restricted mainly by the resistance component and will not be mainly determined by the reactance component.

From the formulæ given above for inductance and A. C. flux density it will be seen that if L is reduced to ¼L the turns will be reduced by half. It follows, therefore, that, for the same current, the flux density is reduced by half, or, is the same for double the current, but since the reactance is proportional only to the inductance, it follows that the reactance is reduced to a quarter. Thus a magnetostrictive projector of inductance ¼L will have the same movement as the magnetostrictive projector of inductance L if the current is doubled. Now the equivalent resistance of the former projector is obviously ¼R since there is the same material in each and $I^2R$ must be the same. Thus an alteration of the inductance can have little effect on the power required to move a given specimen since the reactance and resistance are equally reduced and the ratio therefore remains substantially constant.

From the above it may be concluded therefore that the actual value of L is immaterial. The ratio of reactance to resistance can indeed only be altered by altering the method by which vibration is set up. For example, a quartz projector will have quite a definite reactance to resistance ratio according to the amount of movement set up with such a projector, whereas a magnetostrictive projector has quite another ratio.

The conclusions to be drawn from the above considerations may be summed up as follows:—

(a) A magnetostrictive projector for a given value of inductance may have any desired face area for the same amount of radiated power.

(b) A magnetostrictive projector may have any desired inductance value with a given face area for a predetermined radiated power.

A preferred practical embodiment of the invention is illustrated in Figures 1 to 5 of the accompanying diagrammatic drawing wherein Figure 1 is a sectional elevation of the magnetic circuit of a projector showing the disposition of the energizing and polarizing windings; Figure 2 is a transverse section of the magnetic circuit shown in Figure 1 showing also the method of clamping the laminations and Figure 3 is a part sectional plan view of the arrangement shown in Figure 2. Figure 4 shows the form of the end laminations employed and Figure 5 shows the connections of the energizing and polarizing windings. Figures 6 and 7 are diagrammatic representations of a multiple projector assembly for giving directive wave propagation by the interference method.

Referring to Figures 1 to 3 a magnetostrictive rod 1 built up of laminations 2 is mounted between two E-shaped field members or yokes 3 also built up of laminations, the stacks of laminations forming the E-shaped yokes being built up to substantially the same thickness as that of the rod 1. In the particular construction under consideration the magnetostrictive rod 1 is assembled from insulated nickel laminations 0.004″ thick the length of the laminations being 6.35 cms. and the end faces being 4.5 x 4.5 cms.

Such a magnetostrictive body when vibrating longitudinally as a half wave oscillator has a natural frequency approximately equivalent to a wireless wave length of 8000 metres. The E-shaped laminations are of high permeability material such as "Stalloy" or nickel-iron alloy and of approximately 0.005" thickness. The air-gaps 4 are made as small as is practicable and should not exceed about 0.004" each. Polarizing and energizing windings 5 wound on insulating formers 6 are arranged as shown in the slots between the limbs of the E-shaped yokes 3 and enclose the magnetostrictive rod 1.

The E-shaped laminations carry both D. C. polarizing flux and A. C. energizing flux. On each side of the E-shaped laminations are clamped additional or side laminations 7 (Figures 2, 3 and 4) also of high permeability material and adapted primarily to increase the D. C. flux. These laminations may be from 0.005" to 0.015" in thickness, sufficient of these laminations being employed on each side of the E-shaped yokes to bring up the total thickness of the field system to 9 cms., i. e. twice the thickness of the E-shaped yokes.

The laminations or stampings forming the field system are clamped between angle-iron members 8 by means of bolts 9, sheet brass coil shields 10 also being retained in position by the members 8 as clearly shown in Figures 2 and 3. The magnetostrictive rod 1 is mounted in the field system about the plane of zero movement by means of projections 11 formed on the laminations 2 which projections enter corresponding V-shaped notches 12 formed in the middle limbs of the E-shaped stampings constituting the yokes 3, strips 13 of rubber or other resilient material being inserted in the gaps between the projections 11 and the notches 12. Washers or liners 20 of soft rubber or similar material which does not appreciably interfere with the free end movement of the magnetostrictive body may be inserted in the air gaps 4 said washers serving not only to assist in centering the body within the field system at the extreme ends but to exclude water from the windings. The windings should of course be carefully insulated and thoroughly impregnated to prevent breakdown due to moisture. The windings 5 are subdivided and connected as shown schematically in Figure 5, D. C. polarizing potentials being applied across terminals 14 and A. C. energizing potentials across terminals 15. These windings are so proportioned that the D. C. ampere-turns are at least ten times the A. C. ampere-turns.

Assuming an energizing frequency of 37.5 kilocycles (equivalent approximately to a wire-less wave length of 8000 metres) the water wave length will be of the order of the face dimensions of the magnetostrictive body and in such circumstances substantially spherical radiation will take place and if it is desired to obtain directivity it is essential to use either a reflector or a plurality of projectors operating in phase to give directivity by interference.

With regard to the inteference method of obtaining directivity, a plurality of projector units may be arranged as illustrated schematically in the accompanying Figures 6 and 7 in which a plurality of projector units P are arranged side by side and are distributed as uniformly as possible over an area sufficient to give the desired degree of directivity. The magnetostrictive body MB of each unit may be connected through a suitable distance piece D to a surface plate SP, which when the units are excited in phase will be vibrated bodily after the manner of a piston. The necessity for employing a surface plate is determined mainly by the number of projector units utilized, the greater the number of units the less need is there for a surface plate.

What I claim is:—

1. An electromechanical translating device comprising in combination, a bar-shaped body built up of flat laminations of magnetostrictive material, a pair of yokes built up of E-shaped flat laminations of magnetic material of high permeability, said E-shaped laminations being arranged to lie in planes which are parallel to the planes in which lie the laminations of magnetostrictive material, the ends of the outer limbs of the E-shaped laminations being separated from the edges of the laminations forming the bar-shaped body by small air gaps, said E-shaped laminations being stacked to a thickness slightly greater than that of the body, additional apertured rectangular flat laminations clamped to the sides of said E-shaped laminations and separated from the outer laminations of the bar-shaped body by small air gaps, resilient strips of material for supporting said body midway of its length from the centre limbs of said E-shaped laminations whereby it is free to vibrate as a half-wave oscillator, and a winding resonant to the natural frequency of said body and surrounding said body in the spaces between the limbs of said E-shaped yokes.

2. An electromechanical translating device comprising in combination, a bar-shaped body built up of flat laminations of magnetostrictive material, a pair of yokes built up of E-shaped flat laminations of magnetic material of high permeability, said E-shaped laminations being arranged to lie in planes which are parallel to the planes in which lie the laminations of magnetostrictive material, the ends of the outer limbs of the E-shaped laminations being separated from the edges of the laminations forming the bar-shaped body by small air gaps, said E-shaped laminations being stacked to a thickness slightly greater than that of the body, additional apertured rectangular flat laminations clamped to the sides of said E-shaped laminations and separated from the outer laminations of the bar-shaped body by small air gaps, resilient means for supporting said body midway of its length from the centre limbs of said E-shaped laminations whereby it is free to vibrate as a half-wave oscillator, and a winding resonant to the natural frequency of said body surrounding said body in the spaces between the limbs of said E-shaped yokes.

3. In a submarine echo-sounding system wherein a magnetostrictive body is energized by means of a winding associated therewith at the natural frequency of vibration of said body as a half-wave oscillator for the conversion of electrical energy into mechanical energy, the combination of a body in the form of a short straight bar of an alloy exhibiting marked magnetostrictive properties with fixed yoke members of relatively high permeability material which take no part in the magnetostrictive vibrations of said body, and a winding associated with said body, said body constituting a relatively short portion of a magnetic circuit, the remainder of which is of relatively negligible reluctance and is constituted substantially wholly by said fixed yoke members which are separated from the side faces of said body by relatively small air gaps so that the said body is free to vibrate for the purpose of setting up as a result of movement of the end faces thereof under magnetostrictive action pressure waves of high frequency in a liquid medium in which the apparatus is immersed.

4. In a submarine pressure wave signalling system, an electro-mechanical translating device comprising in combination, a magnetostrictive bar-shaped body constituted by laminations of an alloy exhibiting marked magnetostrictive properties, a pair of fixed E-shaped yoke members constituted by laminations of material of relatively high permeability, said E-shaped yoke members being disposed on opposite sides of said body so that the laminations constituting said yoke members and said body lie in parallel planes, the ends of the outer limbs of said E-shaped yokes being separated from the said opposite sides of the said body by relatively small air gaps, means for supporting said body midway of its length from the ends of the middle limbs of said E-shaped yoke members, and a winding arranged about said body and disposed in the spaces between the limbs of said yoke members, said body together with said yoke members constituting a magnetic circuit linked with said winding and the reluctance of which is concentrated substantially wholly within said body.

5. In a submarine pressure wave signalling system, an electro-mechanical translating device comprising in combination, a magnetostrictive bar-shaped body constituted by laminations of an alloy exhibiting marked magnetostrictive properties, a pair of fixed E-shaped yoke members constituted by laminations of material of relatively high permeability, said E-shaped yoke members being disposed on opposite sides of said body so that the laminations constituting said yoke members and said body lie in parallel planes, the ends of the outer limbs of said E-shaped yokes being separated from the said opposite sides of the said body by relatively small air gaps, means for supporting said body midway of its length from the ends of the middle limbs of said E-shaped yoke members, additional laminations of high permeability material located on opposite sides of said E-shaped laminations and separated from the outer laminations of the magnetostricture body by relatively small air gaps, and a winding arranged about said body and disposed in the spaces between the limbs of said yoke members, said body together with said yoke members constituting a magnetic circuit linked with said winding and the reluctance of which is concentrated substantially wholly within said body.

6. In a submarine echo-sounding system, a pressure wave transmitter comprising in combination a magnetostrictive bar-shaped laminated body mounted so as to be free to vibrate longitudinally and having associated therewith an energizing winding tuned to the natural frequency of vibration of said body as a half-wave oscillator for the conversion of electrical oscillations into mechanical vibrations of said body, a pair of fixed yoke members separated through relatively short gaps from the side faces of said body whose end faces are directly exposed to the sea for allowing magnetostrictive movement of said body, said yoke members constituting return magnetic paths of relatively low reluctance for magnetic flux traversing said body, the arrangement thereby being such that the total reluctance of the magnetic circuit constituted by said body and said yoke members is not substantially greater than that of said body alone.

7. In a submarine echo-sounding system, a magnetostrictive electro-mechanical translating device comprising in combination a bar-shaped body of substantially square cross-section built up of laminations of material exhibiting marked magnetostrictive properties, a pair of E-shaped yoke members built up to a slightly greater thickness than said body from lamination of high permeability material and symmetrically disposed on opposite sides of said bar-shaped body so that the laminations of said body and said yoke members lie in parallel planes, the ends of the limbs of said yoke members being separated from said opposite sides by relatively short air-gaps, additional laminations superimposed on the outer laminations of said yoke members and extending across the spaces between the ends of the limbs of said yoke members, said additional laminations being separated from the outer laminations of said body by relatively short air gaps, windings arranged about said body and located in the spaces between the limbs of said yoke members, resilient supporting means for carrying said body from the center limbs of said yoke members, and resilient packing means inserted in said air gaps.

NORMAN PULLEN HINTON.